(12) United States Patent
Mutreja et al.

(10) Patent No.: US 10,902,018 B2
(45) Date of Patent: Jan. 26, 2021

(54) SYNCHRONIZING IN-USE SOURCE DATA AND AN UNMODIFIED MIGRATED COPY THEREOF

(71) Applicant: Microsoft Technology Licensing, LLC, Redmond, WA (US)

(72) Inventors: Tanu Mutreja, Redmond, WA (US); Gunjan Jain, Seattle, WA (US); Jason Shay, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 218 days.

(21) Appl. No.: 16/114,884

(22) Filed: Aug. 28, 2018

(65) Prior Publication Data

US 2020/0073993 A1    Mar. 5, 2020

(51) Int. Cl.
| | |
|---|---|
| *G06F 16/27* | (2019.01) |
| *G06F 16/13* | (2019.01) |
| *G06F 16/178* | (2019.01) |
| *G06F 16/23* | (2019.01) |
| *G06F 16/182* | (2019.01) |

(52) U.S. Cl.
CPC ......... *G06F 16/273* (2019.01); *G06F 16/137* (2019.01); *G06F 16/178* (2019.01); *G06F 16/184* (2019.01); *G06F 16/2358* (2019.01)

(58) Field of Classification Search
CPC .... G06F 16/273; G06F 16/137; G06F 16/178; G06F 16/2358; G06F 16/184
USPC ........................................................ 707/625
See application file for complete search history.

(56) References Cited

U.S. PATENT DOCUMENTS

| | | | |
|---|---|---|---|
| 9,454,541 B2 | 9/2016 | Chou | |
| 2013/0138608 A1* | 5/2013 | Smith | ................ G06F 16/1787 707/610 |

(Continued)

FOREIGN PATENT DOCUMENTS

CN    103401902 A    11/2013

OTHER PUBLICATIONS

"Sneakernet", Retrieved from: https://en.wikipedia.org/w/index.php?title=Sneakernet&oldid=853978550, Aug. 8, 2018, 7 Pages.

(Continued)

*Primary Examiner* — Evan Aspinwall
(74) *Attorney, Agent, or Firm* — Fiala & Weaver P.L.L.C.

(57) ABSTRACT

Embodiments described herein are directed to enabling a user to modify data stored locally during a data migration process in which the user's data is being transferred to the cloud. For instance, a synchronization service requests the user's device (e.g., a client-based server) to provide a hash value for each data object maintained thereby (including modified data objects) and compares the hash values to hash values generated for the data uploaded to the cloud. If a hash value provided by the server does not match any of the hash values generated for the uploaded data, this means that the data object associated with the unmatched hash value has been modified since the initiation of the data transfer process. The synchronization service receives the modified data object from the server and uploads it to the cloud, thereby synchronizing the data uploaded to the cloud with the data locally-maintained by the server.

20 Claims, 8 Drawing Sheets

(56) References Cited

U.S. PATENT DOCUMENTS

| | | | | |
|---|---|---|---|---|
| 2015/0234885 A1* | 8/2015 | Weinstein | ............. | G06F 16/152 |
| | | | | 707/690 |
| 2016/0085769 A1* | 3/2016 | Penangwala | .......... | G06F 16/137 |
| | | | | 707/610 |
| 2018/0314697 A1* | 11/2018 | Ambar | .................... | H04L 67/06 |
| 2018/0349408 A1* | 12/2018 | Jewell | ................ | G06F 16/1734 |

OTHER PUBLICATIONS

"International Search Report and Written Opinion Issued in PCT Application No. PCT/US19/038803", dated Sep. 23, 2019, 13 Pages.

* cited by examiner

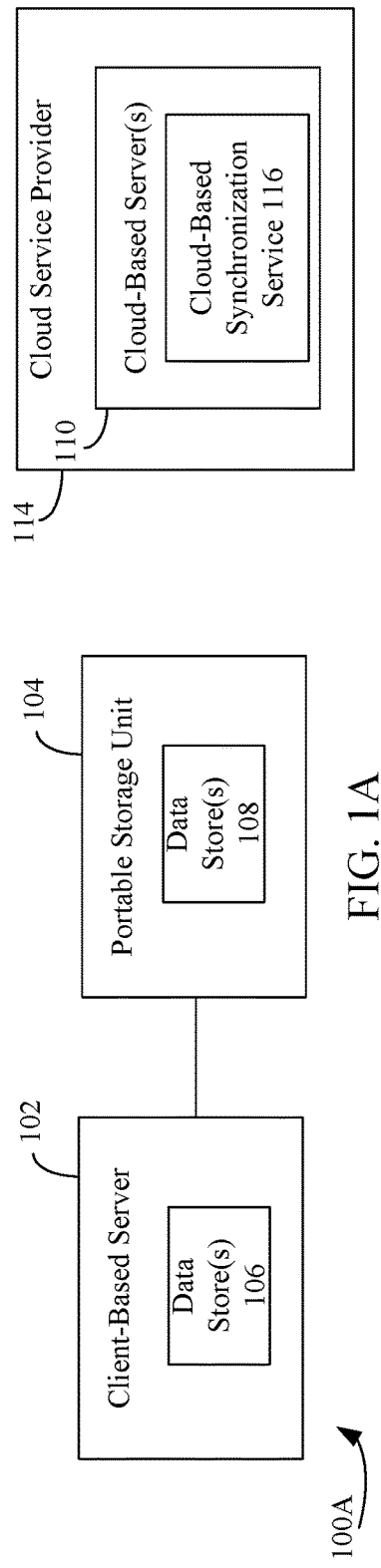
FIG. 1A
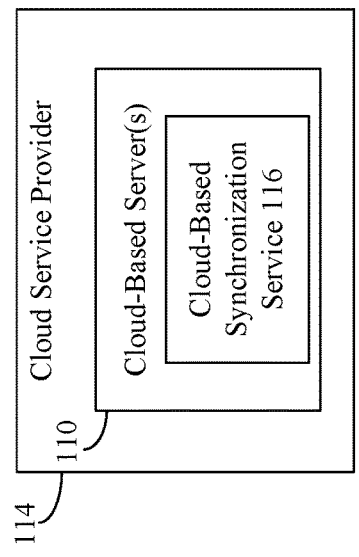
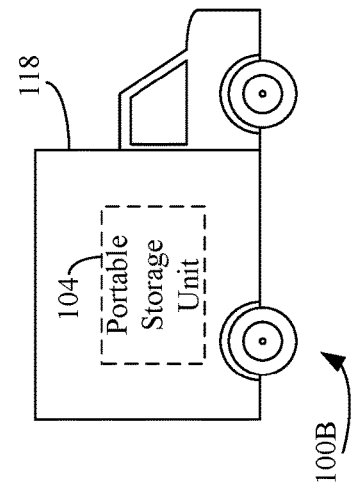
FIG. 1B
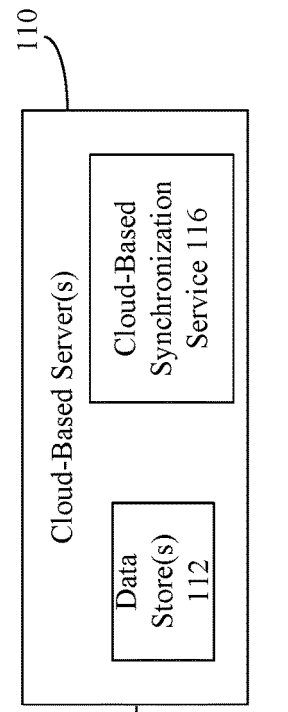
FIG. 1C

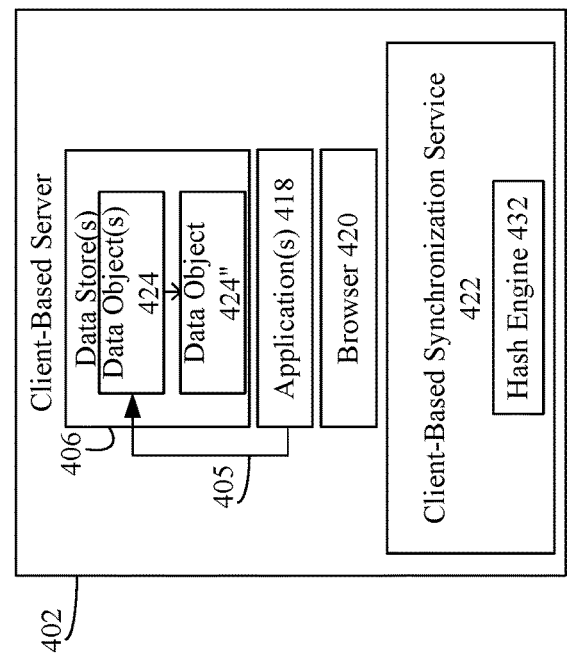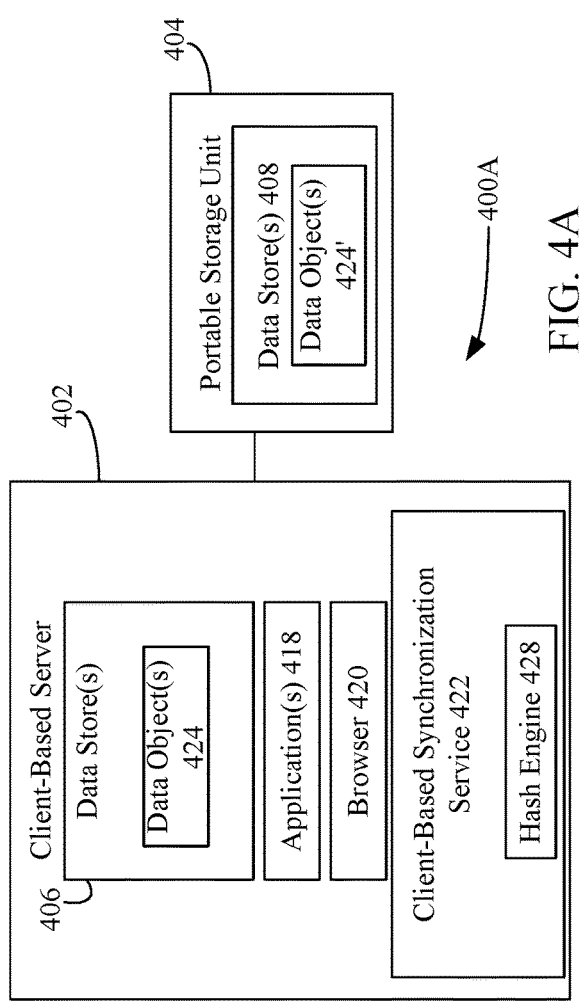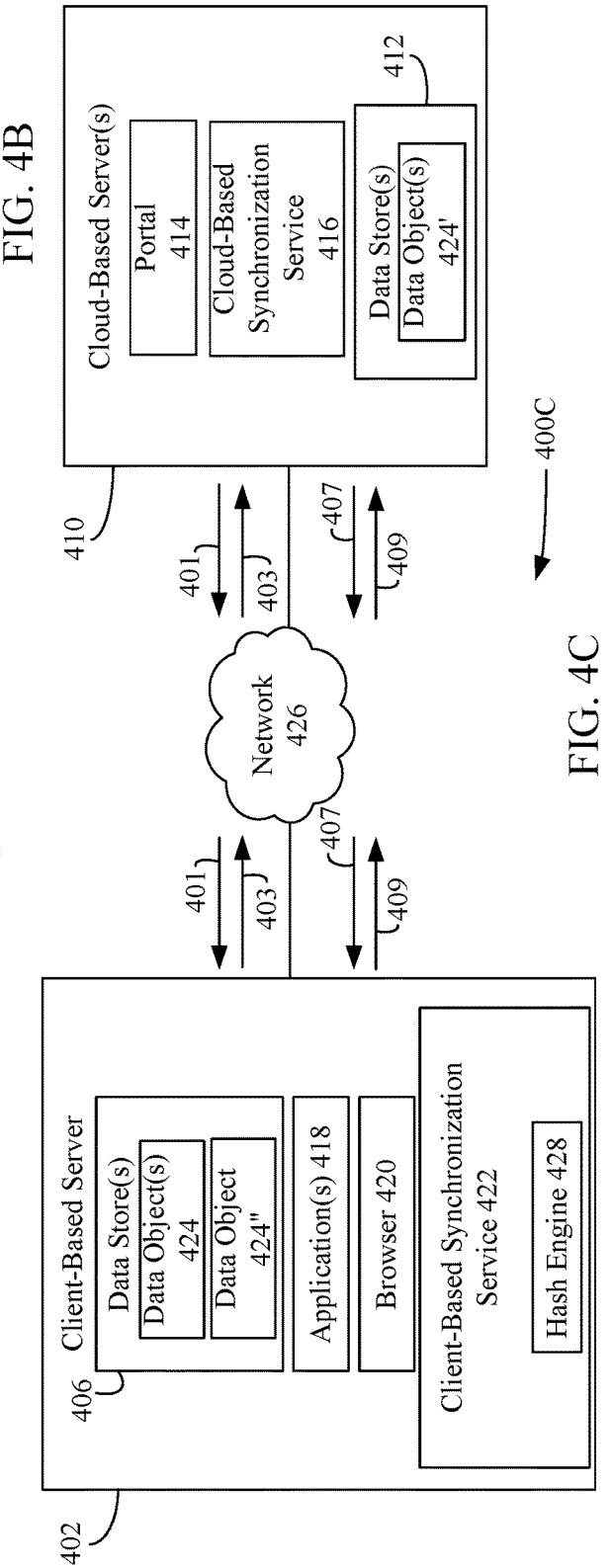

SYNCHRONIZING IN-USE SOURCE DATA AND AN UNMODIFIED MIGRATED COPY THEREOF

BACKGROUND

Cloud computing platforms offer higher efficiency, greater flexibility, lower costs, and better performance for applications and services. Accordingly, users are shifting away from locally maintaining applications, services, and data and migrating to cloud computing platforms. However, data migration can be quite cumbersome given that the amount of data to be migrated can be terabytes or even petabytes of data. Conventional network-based data transfer techniques struggle to facilitate migration of such large amounts of data due to the amount of network bandwidth utilized by such transfers.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments described herein are directed to enabling a user to modify source data stored in first storage (e.g., in "local" storage) during a process of transporting a copy of the data (e.g., migrating the data) to second storage (e.g., "cloud" storage) through the use of an intermediate portable storage device. After the copy of the data is stored in the second storage, the copy of the data stored in the second storage may be synchronized with the source data stored in the first storage, such that the copy of the data in the second storage is updated with any changes made to the source data during a time interval of the data transport.

For instance, in an aspect, data stored in storage local to a user's device (e.g., a client-based server) may be migrated to cloud storage. A cloud-based synchronization service may request the client-based server to provide a hash value for each data object maintained thereby (including modified data objects), and may compare the hash values to hash values generated for the data stored in the cloud. If a particular hash value of the hash values provided by the client-based server does not match any of the hash values generated for the cloud-based data, this means that the data object associated with the unmatched hash value has been modified (or newly-created) since the initiation of the data transfer process, and therefore, is not up-to-date in the cloud. Consequently, the cloud-based synchronization service receives the modified (or newly-created) data object from the client-based server and uploads the data object to the cloud storage upon receiving it from the client-based server, thereby synchronizing the data uploaded to the cloud with the data locally-maintained by the client-based server. If a particular hash value of the hash values provided by the client-based server matches one of the hash values generated for the uploaded data, this means that cloud-based server already has an up-to-date copy of the data object associated with the matched hash value, and therefore, need not request the data object from the client-based server.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

FIG. 1A is a block diagram of a computing system that includes a client-based server and a portable storage unit in accordance with an example embodiment.

FIG. 1B is a block diagram depicting a portable storage unit being transported to a cloud service provider in accordance with an example embodiment.

FIG. 1C is a block diagram of a system that includes a portable storage unit and a cloud-based server(s) in accordance with an embodiment.

FIG. 4A is a block diagram of a portion of a data migration system for copying data maintained by a client-based server to a portable storage unit in accordance with an example embodiment.

FIG. 4B is a block diagram of a client-based server, which is enabled to modify locally-maintained data during a data transfer process, in accordance with an example embodiment.

FIG. 4C is a block diagram of a portion of a data migration system for synchronizing changes made locally by the user with data stored on a client-based server to cloud-based server(s) in accordance with an example embodiment.

Figure 2:
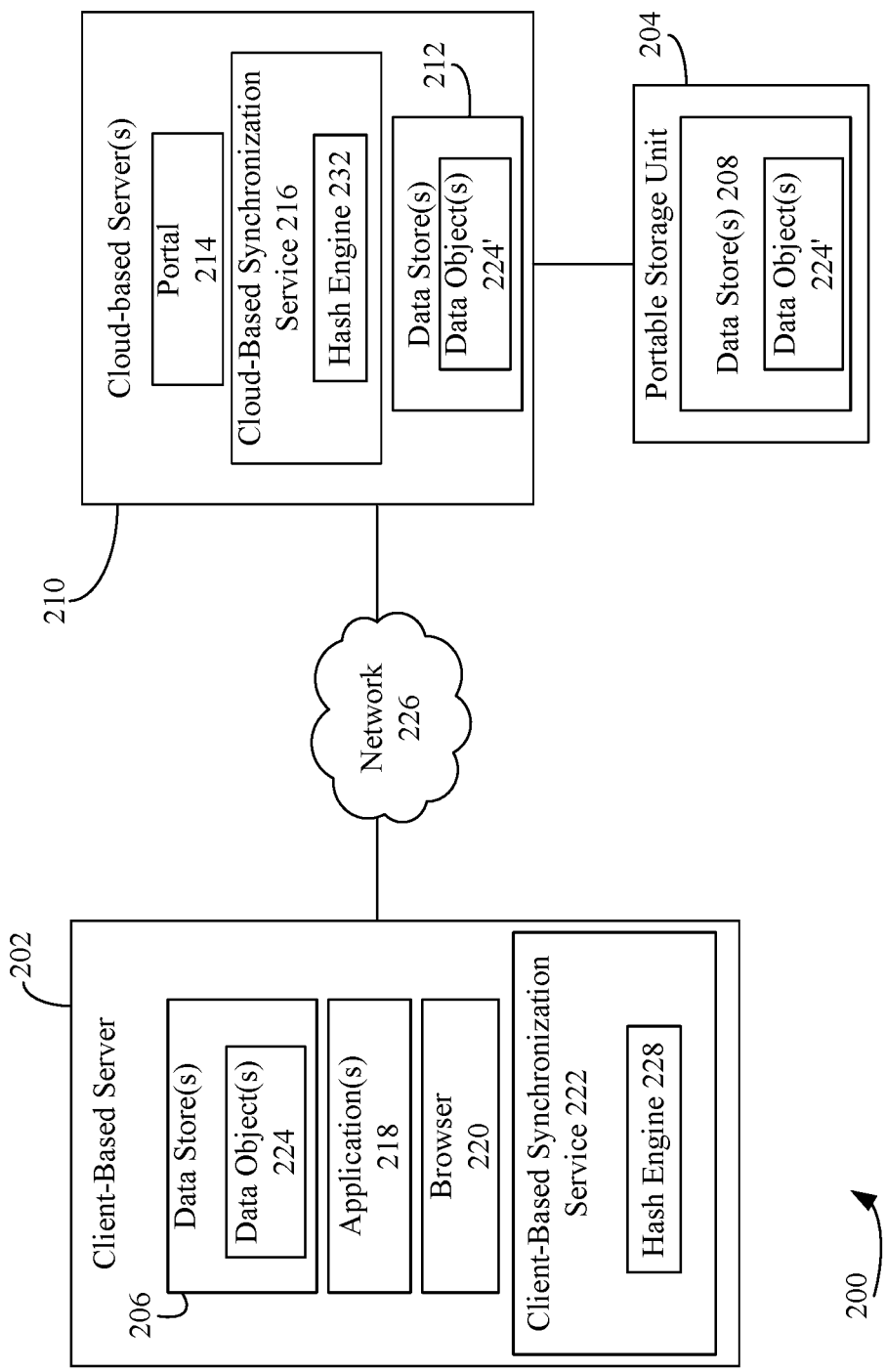
FIG. 2 is a block diagram of a data migration system for enabling a user to modify locally-maintained data during a data transfer process and synchronizing the modified data with data uploaded to the cloud in accordance with an embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Systems and Methods for Enabling the Modification of Locally-Maintained Data During a Cloud-Based Data Transfer Process Embodiments described herein are directed to enabling a user to modify data stored in first storage during a data transfer (e.g., migration) process in which the user's data is being transferred to the cloud. For instance, the user may request a cloud-based provider to provide a portable storage unit to the user. The user copies the data he/she would like to transfer to the cloud to the portable storage unit and ships the portable storage unit to the cloud service provider. Upon receiving the portable storage unit, the cloud service provider copies the data from the portable storage unit to data store(s) maintained by a cloud-based server that is associated with the user's cloud service account. During this transfer process (i.e., between the time that the data is copied from the user's storage to the portable storage unit and is then stored in the cloud-based server's data store, which includes the time the portable storage unit is undergoing shipment to the cloud service provider), the user may modify the data maintained locally (in the first storage). Once the data is copied ("uploaded") to the cloud-based server, a cloud-based synchronization service synchronizes the data maintained locally on the user's device to the data stored at the cloud-based server.

For instance, the cloud-based synchronization service may request the user's device (e.g., a client-based server) to provide a hash value for each data object maintained thereby (regardless if the data object has been modified since initiation of the data transfer process) and may compare the hash values to hash values generated for the data copied to the cloud-based server. If a particular hash value of the hash values provided by the client-based server does not match any of the hash values generated for the uploaded data, this means that the data object associated with the unmatched hash value has been modified (or newly-created) since the initiation of the data transfer process, and therefore, its present version has not been uploaded to the cloud-based server. In response, the cloud-based synchronization service requests the modified (or newly-created) data object from the client-based server and uploads the current (modified) version of the data object to the cloud-based server upon receiving it from the client-based server, thereby synchronizing the data uploaded to the cloud with the data locally-maintained by the client-based server. If a particular hash value of the hash values provided by the client-based server matches one of the hash values generated for the uploaded data, this means that cloud-based server already has an up-to-date copy of the data object associated with the matched hash value, and therefore, does not request the data object from the client-based server.

The foregoing techniques advantageously remove the requirement to lock the user's data during the data transfer process, which can prevent access to the data for days or even weeks, depending on the time it takes for the cloud service provider to receive the user's data and upload the data to the cloud. Moreover, because the user's data is being provided to the cloud service provider via a portable storage unit (and not via a network connection), network traffic across the user's network is advantageously reduced, thereby freeing up network bandwidth, as well as the processing power used to facilitate the data transfers.

FIGS. 1A-1C describe a data transfer process between a client-based server and a cloud service provider in accordance with an example embodiment. For instance, FIG. 1A is a block diagram of a system 100A that includes a client-based server 102 and a portable storage unit 104 in accordance with an example embodiment. In order to transfer the user's data to the cloud, the user may first sign up for a subscription with a cloud service provider 114. The subscription may grant access to a portal provided by a cloud service provider 114 that enables the user to perform several functions. For example, the portal may enable the user to launch virtual machines and applications, request hardware resources (e.g., data storage), and/or configure cloud-based server(s) 110 maintained by cloud service provider 114 for various operations. The portal may also be utilized to initiate a data transfer process, where the user desires to transfer data locally maintained by the client-based server to the cloud. For example, the user, via the portal, may request cloud service provider 114 to send (e.g., ship) portable storage unit 104 to the user's premises. Portable storage unit 104 may comprise one or more data store(s) 108. The user may communicatively couple portable storage unit 104 to client-based server 102, which comprises data store(s) 106 that store the user's data. Data store(s) 106 and data store(s) 108 may comprise one or more physical memory and/or storage device(s) (e.g., hard disk drives, solid state drives (SSDs), etc.). Data store(s) 106 and data store(s) 108 may be any type of physical memory and/or storage device that is described herein, and/or as would be understood by a person of skill in the relevant art(s) having the benefit of this disclosure. Portable storage unit 104 and client-based server 102 may be communicatively coupled via a wired connection (e.g., via a Universal Serial Bus (USB) cable, a IEEE 1394-based (i.e., Firewire) cable, an external Serial ATA cable, an RJ45 cable, etc.) or via a wireless connection (e.g., via a IEEE 802.11 wireless LAN (WLAN) connection).

After the user's data has been transferred to data store(s) 108 of portable storage unit 104, the user may send portable storage unit 104 back to cloud service provider 114. For example, as shown in FIG. 1B, the user may provide portable storage unit 104 to a carrier (e.g., UPS®, USPS®, FedEx®, etc.), and the carrier may physically transport portable storage unit 104 to cloud service provider 114 via a delivery vehicle 118. Cloud service provider 114 maintains one or more cloud-based servers 110.

As shown in FIG. 1C, upon receiving portable storage unit 104, cloud service provider 114 may communicatively couple portable storage unit 104 to client-based server(s) 110. Portable storage unit 104 and cloud-based server(s) 114 may be communicatively coupled via any of the wired or wireless connections described above. Cloud service provider 114 may then upload the data stored on portable storage unit 104 to data store(s) 112 maintained by cloud-based server(s) 110. Data store(s) 112 may be any type of physical memory and/or storage device that is described herein, and/or as would be understood by a person of skill in the relevant art(s) having the benefit of this disclosure.

The above-described data transfer process described above with reference to FIGS. 1A-1C may take several days or even weeks depending on the time it takes to physically transport portable storage unit 104 to cloud service provider 114 and for cloud service provider 114 to upload the data to cloud-based server(s) 110. During this time, it may be desirable for the user to modify the data locally maintained thereby while the data transfer process takes places. The embodiments described below describe various techniques for enabling a user to modify locally maintained data and synchronizing the modified data with the data uploaded to cloud-based server(s) 110 using a cloud-based synchronization service 116 that executes on cloud-based server(s) 114.

For instance, FIG. 2 is a block diagram of a system 200 for enabling a user to modify locally-maintained data during a data transfer process and synchronizing the modified data with data uploaded to the cloud in accordance with an embodiment. As shown in FIG. 2, system 200 includes a client-based server 202, cloud-based server(s) 210 and a portable storage unit 204. Client-based server 202, cloud-based server(s) 210, and portable storage unit 204 are examples above client-based server 102, cloud-based server(s) 110, and portable storage unit 104, as described above with reference to FIGS. 1A-1C. As shown in FIG. 2, client-based server 202 and cloud-based server(s) 210 are communicatively coupled via a network 226. Network 226 may comprise one or more networks such as local area networks (LANs), wide area networks (WANs), enterprise networks, the Internet, etc., and may include one or more of wired and/or wireless portions.

As shown in FIG. 2, client-based server 202 comprises data store(s) 206, which store one or more data object(s) 224. Data object(s) 224 represent the user's locally maintained data, and may be considered "source" data. Examples of data object(s) 224 include, but are not limited to, a data file, a database object (e.g., a table, a directory, etc.), structured data, unstructured data, semi-structured data, a data container, etc.

A user may be enabled to utilize the services offered by cloud-based server(s) 210. For example, a user may be enabled to utilize the services offered by cloud-based server(s) 210 without cost, or by signing-up with a subscription with a cloud service provider (e.g., cloud service provider 114, as shown in FIG. 1B) of cloud-based servers(s) 210. The user may be given access to a portal 214 executing on cloud-based server(s) 210.

The user may access portal 214 by interacting with an application executing on client-based server 202 capable of accessing portal 214. For example, the user may use a browser 220 to traverse a network address (e.g., a uniform resource locator) to portal 214, which invokes a user interface (e.g., a web page) in a browser window rendered on a display coupled to client-based server 202. By interacting with the user interface, the user may utilize portal 214 to launch virtual machines and applications, request hardware resources (e.g., data storage), and/or configure cloud-based server(s) 210 for various operations. Portal 214 may also be utilized to initiate a data transfer process, where the user desires to transfer data object(s) 224 to cloud-based server(s) 210. For example, the user, via portal 214, may request the cloud service provider to send (e.g., ship) portable storage unit 204 to the user's premises. As shown in FIG. 2, the user has already requested portable storage unit 204, copied data object(s) 224 from client-based server 202 to portable storage unit 204 (shown as data object(s) 224', which may be referred to as "copied" data) and has sent (e.g., shipped) portable storage unit 204 back to the cloud-based provider.

After the user has copied data object(s) 224 to portable storage unit 204, the user may modify data object(s) 224, which may thereafter be referred to as modified source data. In particular, the user may interact with one or more applications 218 executing on client-based server 202, which may modify data object(s) 224. Examples of application(s) 218 include, but are not limited to, email applications, calendars, contact managers, web browsers, messaging applications, and any other computing applications (e.g., word processing applications, mapping applications, spreadsheet applications, media player applications, etc.).

As further shown in FIG. 2, cloud-based server(s) 210 are configured to execute a cloud-based synchronization service 216, and client-based server is configured to execute a client-based synchronization service 222. Cloud-based synchronization service 216 is an example of cloud-based synchronization service 116, as shown in FIGS. 1A-1C. Cloud-based synchronization service 216 and client-based synchronization service 222 are configured to synchronize data object(s) 224' maintained by cloud-based server(s) 210 with data object(s) 224 maintained by client-based server. In particular, cloud-based synchronization service 216 may determine whether any changes were made to data object(s) 224 maintained by client-based server 202 and incorporates those changes with respect to data objects(s) 224', which may be unmodified. For example, cloud-based synchronization service 216 may comprise a hash engine 232, which is configured to map each of data object(s) 224' to a bit string of a fixed size (i.e., a hash value). Cloud-based synchronization service 216 may generate a hash value for a particular data object by applying a hash function (e.g., a cryptographic hash function) on the data object (e.g., the contents of the data object).

Cloud-based synchronization service 216 may also provide a notification to client-based synchronization service 222 via network 226 that indicates that data object(s) 224' have been uploaded to cloud-based server(s) 210. Upon receiving the notification, client-based synchronization service 222 may provide a respective hash value for each of data object(s) 224 to cloud-based synchronization service 216. For example, client-based synchronization service 222 may comprise a hash engine 228 that is configured to generate a hash value for each of data object(s) 224. In accordance with an embodiment, hash engine 228 generates the hash value for each of data object(s) 224 responsive to receiving the notification from cloud-based synchronization service 216. In accordance with another embodiment, hash engine 228 generates the hash value for a particular data object of data object(s) 224 after the data object has been created and/or modified. Hash engine 228 uses the same hash function utilized by hash engine 232 to generate the hash value for each of data object(s) 224. The hash function utilized by hash engine 228 and hash engine 232 may be in accordance with a hash algorithm, including, but not limited to, Secure Hash Algorithm (SHA)-0, SHA-1, SHA2, SHA-3 Digital Signature Algorithm (DSA), and/or the like.

The hash values generated for data object(s) 224 may be provided to cloud-based synchronization service 216 as metadata via network 226. The metadata for a particular data object may also comprise one or more attributes associated with the data object. The attribute(s) include, but are not limited to, one or more file access attributes (e.g., read/write permissions), an author of the data object, one or more time stamps that indicate a time at which the data object is created and/or modified, a directory or file path indicative of the location at which each the data object is located, etc.

During synchronization, client-based synchronization service 222 provides the hash values generated for each of data object(s) 224 to cloud-based synchronization service 216. For example, when synchronizing a particular data object of data object(s) 224, client-based synchronization service 222 provides the hash value generated for that data object to cloud-based synchronization service 216. For each hash value received, cloud-based synchronization service 216 may compare the hash values generated for data object(s) 224' to the received hash value. If a different hash value is detected (i.e., the received hash value does not match any of the hash values generated for data object(s) 224'), cloud-based synchronization service 216 determines that a data object of data object(s) 224' has been modified locally at client-based server 202 or that a new data object has been created at client-based server 202. Responsive to detecting a different hash value, cloud-based synchronization service 216 may transmit an indicator specifying that the received hash value does not match the hash values generated by cloud-based synchronization service 216 for data object(s) 224' to client-based synchronization service 222. In response, client-based synchronization service 222 provides the modified (or newly-created) data object to cloud-based synchronization service 216 via network 226.

Cloud-based synchronization 216 stores the received data object(s) into data store(s) 212, and, as a result, cloud-based server(s) 210 stores the same version of the data object(s) that are maintained by client-based server 202 (i.e., the data object(s) maintained by cloud-based server(s) 210 is synchronized with the data object(s) maintained by client-based server 202). In the event that the received hash value matches at least one of the hash values generated by cloud-based synchronization service 216, client-based synchronization service 222 may determine that cloud-based server(s) already has the associated data object and does not send the data object to cloud-based synchronization service 216 (i.e., data object(s) 224') are already stored in data store(s) 212. That is, cloud-based synchronization service maintains such data object(s). The foregoing process may be performed for each data object to be synchronized in an iterative manner, where after cloud-based synchronization service 216 provides a notification to client-based synchronization service 222 indicating that data object(s) 224' have been uploaded to cloud-based server(s) 210, client-based synchronization service 222 may iteratively provide each hash value for a data object to be synchronized and cloud-based synchronization service 216 may provide an indicator for that data object specifying whether the received hash value matches the hash values generated by cloud-based synchronization service 216.

It is noted that the received hash value may match a hash value generated by cloud-based synchronization service 216 for a completely different data object. For example, a first data object that was originally transferred to cloud-based server(s) 210 via portable storage unit 204 may have been modified locally at client-based server 202 such that its contents are now identical to a second data object that was already transferred to cloud-based server(s) 210. Because the contents are identical, the hash value generated for the modified first data object may match the hash value generated for the second data object. During synchronization, when client-based synchronization service 222 sends the hash value for the first modified data object, cloud-based synchronization service 216 may determine that the hash value matches the hash value generated by cloud-based synchronization service 216 for the second data object, and therefore, sends an indication to client-based synchronization service 222 specifying that the received hash value matches a hash value generated by cloud-based synchronization service 216. Consequently, client-based synchronization service 222 does not send the first modified data object to cloud-based synchronization service 216, as cloud-based server(s) 210 already maintains a data object corresponding thereto.

When receiving a modified data object or maintaining a data object that has already been copied to cloud-based server 210, the attribute(s) received for the data object via the metadata are applied to the data object. For example, cloud-based synchronization service 216 may set the file access permissions for the data object, the date on which the data object was created and/or modified, the author of the data object, and/or other characteristics specified by the metadata. Cloud-based synchronization service 216 may also organize each data object in accordance with the file path(s) and/or director(ies) specified in the metadata. Cloud-based synchronization service 216 may organize each data object after receiving all the modified and/or newly-created data object(s) from client-based server 202.

It is noted that each of portal 214 and cloud-based synchronization service 216 may be executed on the same or a different cloud-based server of cloud-based server(s) 210. It is also noted that each of data store(s) 212 may located and/or maintained on the same or a different cloud-based server of cloud-based server(s) 210. It is further noted that each of data store(s) 212 may be located and/or maintained on the same cloud-based server on which portal 214 and/or cloud-based synchronization server 216 execute or on a different cloud-based server of cloud-based server(s) 212.

Figure 3:
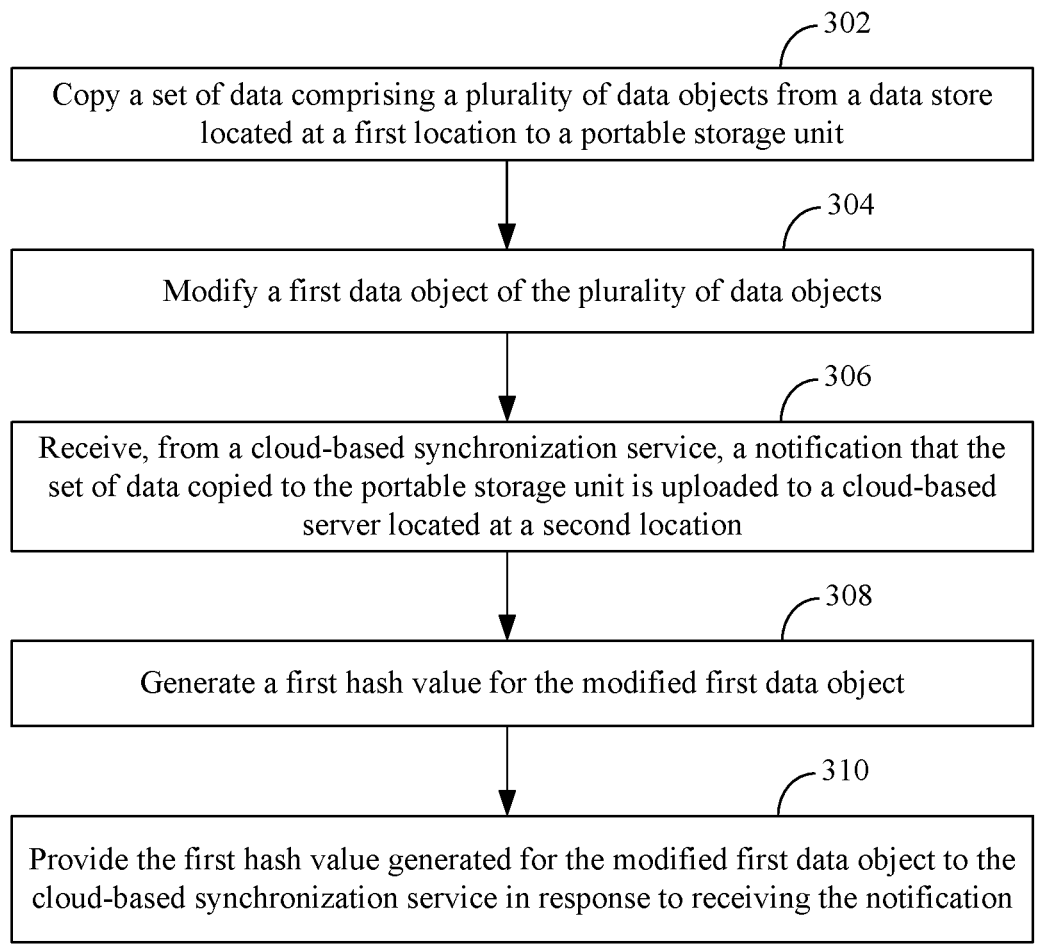
FIG. 3 depicts a flowchart of an example method performed by a client-based synchronization process that enables a user to modify locally-maintained data during a data transfer process and synchronizes the modified data with cloud-based data in accordance with an example embodiment.

Accordingly, a user is enabled to modify locally-maintained data during a data transfer process in many ways. For example, FIG. 3 depicts a flowchart 300 of an example method performed by a client-based synchronization process that enables the user to modify locally-maintained data during a data transfer process and synchronizes the modified data with cloud-based data in accordance with an example embodiment. The method of flowchart 300 will now be described with reference to FIGS. 4A-4C, although the method is not limited to the implementation depicted therein. FIG. 4A is a block diagram of system 400A for copying data maintained by a client-based server 402 to a portable storage unit 404 in accordance with an example embodiment. FIG. 4B is a block diagram of client-based server 402, which is enabled to modify locally-maintained data during a data transfer process, in accordance with an example embodiment. FIG. 4C is a block diagram of a system 400C for synchronizing changes made locally by the user with data stored on client-based server 402 to cloud-based server(s) 410 in accordance with an example embodiment. As shown in FIG. 4A, system 400A includes client-based server 402 and portable storage unit 404. Client-based server 402, portable storage unit 404, and cloud-based server(s) 410 are examples of client-based server 202, portable storage unit 204, and cloud-based server(s) 210, as described above with reference to FIG. 2. As further shown in FIGS. 4A-4C, client-based server 402 comprises data store(s) 406, application(s) 418, browser 420, and client-based synchronization service 422, each of which are examples of data store(s) 206, application(s) 218, browser 220, and client-based synchronization service 222, as described above with reference to FIG. 2. Client-based synchronization 422 comprises a hash engine 428, which is an example of hash engine 228, as described above with reference to FIG. 2. As shown in FIG. 4A, portable storage unit 404 comprises data store(s) 408, which is an example of data store(s) 208, as described above with reference to FIG. 2. As shown in FIG. 4C, cloud-based server(s) 410 comprise a portal 414, a cloud-based synchronization service 416, and data store(s) 412, each of which is an example of portal 214, cloud-based synchronization service 216, and data store(s) 212, as described above with reference to FIG. 2. As further shown in FIG. 4C, cloud-based server(s) 410 are communicatively coupled to client-based server 402 via network 426, which is an example of network 226, as described above with reference to FIG. 2. Other structural and operational embodiments will be apparent to persons skilled in the relevant art(s) based on the discussion regarding flowchart 300 and FIGS. 4A-4C.

As shown in FIG. 3, the method of flowchart 300 begins at step 302, in which a set of data comprising a plurality of data objects is copied from a data store located at a first location to a portable storage unit. For example, with reference to FIG. 4A, data object(s) 424 stored in data store(s) 406 of client-based server 402 (which is located at the user's premises) are copied to portable storage unit 404. The data object(s) copied to portable storage unit are shown as data object(s) 424'. After data object(s) 424 are copied to portable storage unit 404, the user may send portable storage unit 404 to the cloud service provider.

At step 304, a first data object of the plurality of data objects is modified. For example, as shown in FIG. 4B, application(s) 418 may modify a data object of data object(s) 424 via an input/output (I/O) operation 405 (e.g., a write operation) to the data object. The modified data object is shown as data object 424".

In accordance with one or more embodiments, the first data object of the plurality of data objects is modified while the portable storage unit is being physically transported to the second location comprising the plurality of cloud-based servers. For example, with reference to FIGS. 4A-4C, data object(s) 424 may be modified while portable storage unit 404 is being physically transported to the second location (e.g., the cloud service provider's location) comprising cloud-based server(s) 410.

At step 306, a notification is received from a cloud-based synchronization service that the set of data copied to the portable storage unit is uploaded to a cloud-based server located at a second location. For example, with reference to FIG. 4C, after data objects(s) 424' are uploaded to data store(s) 412 maintained by cloud-based server(s) 410, cloud-based synchronization service 416 may provide a notification 401 to client-based synchronization service 422 via network 426.

At step 308, a first hash value for the modified first data object is generated. For example, with reference to FIG. 4C, hash engine 428 generates a first hash value for modified data object 424".

In accordance with one or more embodiments, the first hash value for the modified first data object is generated in response to receiving the notification. For example, with reference to FIG. 4C, hash engine 428 generates the first hash value in response to receiving notification 401.

In accordance with one or more embodiments, the first hash value for the modified first data object is generated responsive to the first data object being modified. For example, with reference to FIG. 4B, hash engine 428 generates the first hash value in response to application(s) 418 modifying data object(s) 424 via I/O command 405.

At step 310, the first hash value generated for the modified first data object is provided to the cloud-based synchronization service in response to receiving the notification. The cloud-based synchronization service is configured to compare the first hash value to a second hash value generated for a second data object uploaded to the cloud-based server that corresponds to the first data object to determine whether a difference exits between the first data object and the corresponding second data object. For example, with reference to FIG. 4C, responsive to client-based synchronization service 422 receiving notification 401, client-based synchronization provides a notification 403 that comprises the first hash value generated by hash engine 428 for modified data object 424" to cloud-based synchronization service 416 via network 426. Cloud-based synchronization service 416 is configured to compare the first hash value to a second hash value generated for a data object of data object(s) 424" that corresponds to modified data object 424" to determine whether a difference exists between modified data object 424" and the corresponding data object copied to cloud-based server 410.

In accordance with one or more embodiments, an indicator specifying whether the first hash value is different than the second hash value is received from the cloud-based synchronization service. The modified first data object is provided to the cloud-based synchronization service in response to the indicator specifying that the first hash value is different than the second hash value. For example, with reference to FIG. 4C, cloud-based synchronization service 416 may provide an indicator 407 that specifies whether the first hash value provided via notification 403 is different than the second hash value(s) generated for data object(s) 424'. In response to indicator 403 specifying that the first hash value is different than the second hash value(s), client-based synchronization service 422 provides modified data object 424" to cloud-based synchronization service 416 via a response 409.

In accordance with one or more embodiments, metadata associated with the modified first data object is provided. The metadata comprises the first hash value and at least one of a file access attribute of the modified first data object, a time stamp that indicates a time at which the modified first data object was modified, a directory in which the modified first data object is located, or the name of the modified first data object.

In accordance with one or more embodiments, a third hash value for each of the other data objects of the plurality of data objects and the third hash values are provided to the cloud-based synchronization service in response to receiving the notification, the cloud-based synchronization service being configured to compare the third hash values to fourth hash values generated for data objects uploaded to the cloud-based server that correspond to the other data objects of the data store to determine whether a difference exits between the data objects uploaded to the cloud-based server and the other data objects. For example, with reference to FIG. 4C, client-based synchronization service 422 may generate a third hash value for data object(s) 424 and provides the third hash values to cloud-based synchronization service 416, for example, via respective notification(s) 403. Cloud-based synchronization service 416 compares the third hash values to fourth hash values generated for the other data objects uploaded to cloud-based server 410 to determine whether a difference exists between data object(s) 424' and the data object(s) 424. For example, cloud-based synchronization service 416 may provide an indicator 407 for each notification 403 received specifying whether a corresponding first hash value of a particular data object to be synchronized is different than the second hash value(s) generated for data object(s) 424'. Client-based synchronization service 422 may provide a response (i.e., response 409) including a modified data object for each indicator 407 specifying that a corresponding first hash value is different than the second hash value(s).

In accordance with an embodiment, cloud-based synchronization service 416 copies data object(s) 424' from portable storage unit 404 to a temporary location maintained by the cloud service provider. While data object(s) 424' are stored at the temporary location, cloud-based synchronization service 416 determines whether client-based server 402 stores modified instances of data object(s) 424 (e.g., data object 424"). Data object(s) that have not been modified are copied to a primary location, and data object(s) that have been modified are retrieved from client-based server 402 and subsequently stored at the primary location. Once all the data object(s) have been synchronized and stored at the primary location, the data object(s) are made available for the user to use. Such an embodiment is described below with reference to FIGS. 5 and 6.

Figure 5:
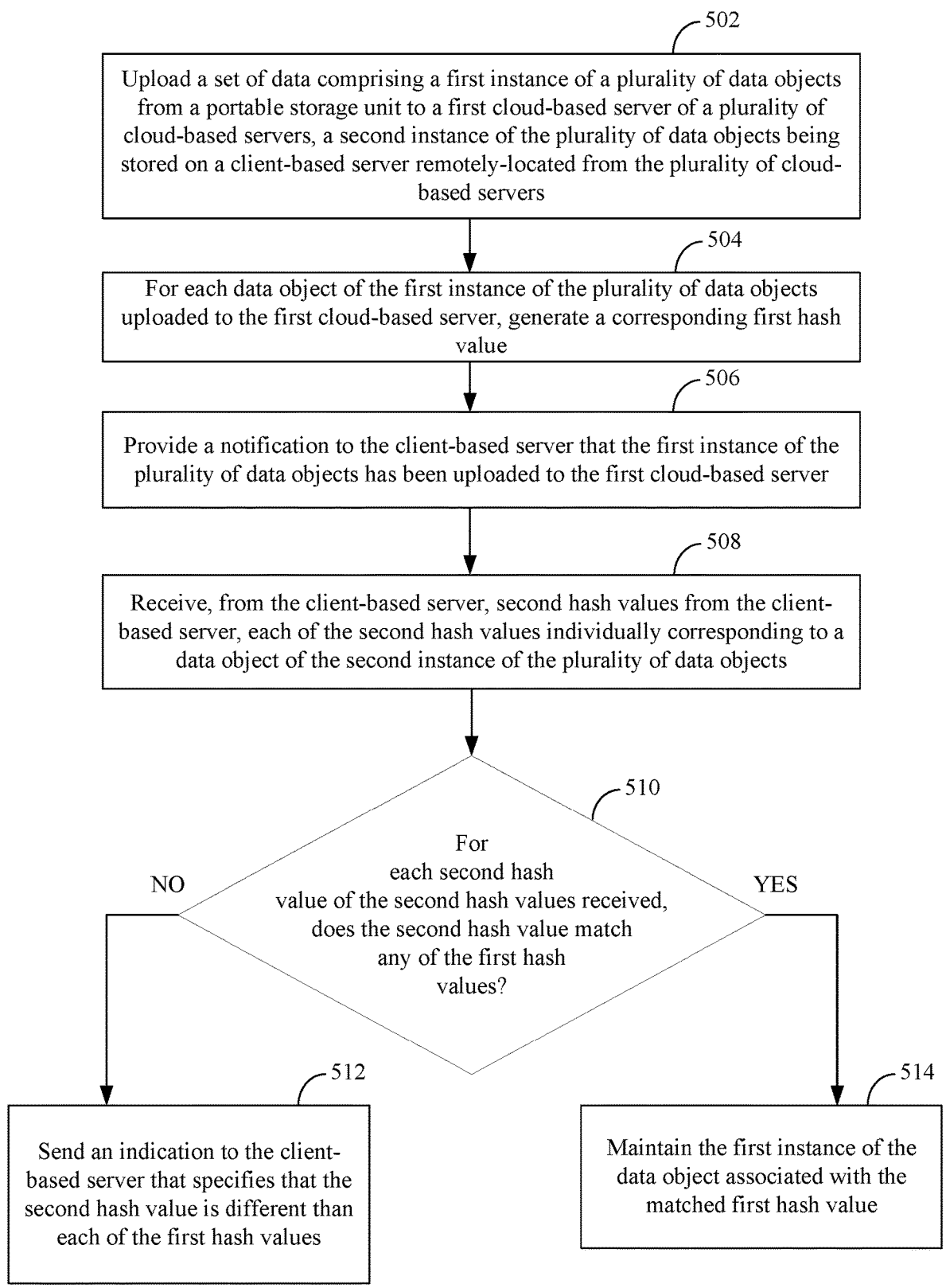
FIG. 5 depicts a flowchart of an example method performed by a cloud-based synchronization service for synchronizing data locally modified by the user with data maintained by cloud-based server(s) in accordance with an example embodiment.
Figure 6:
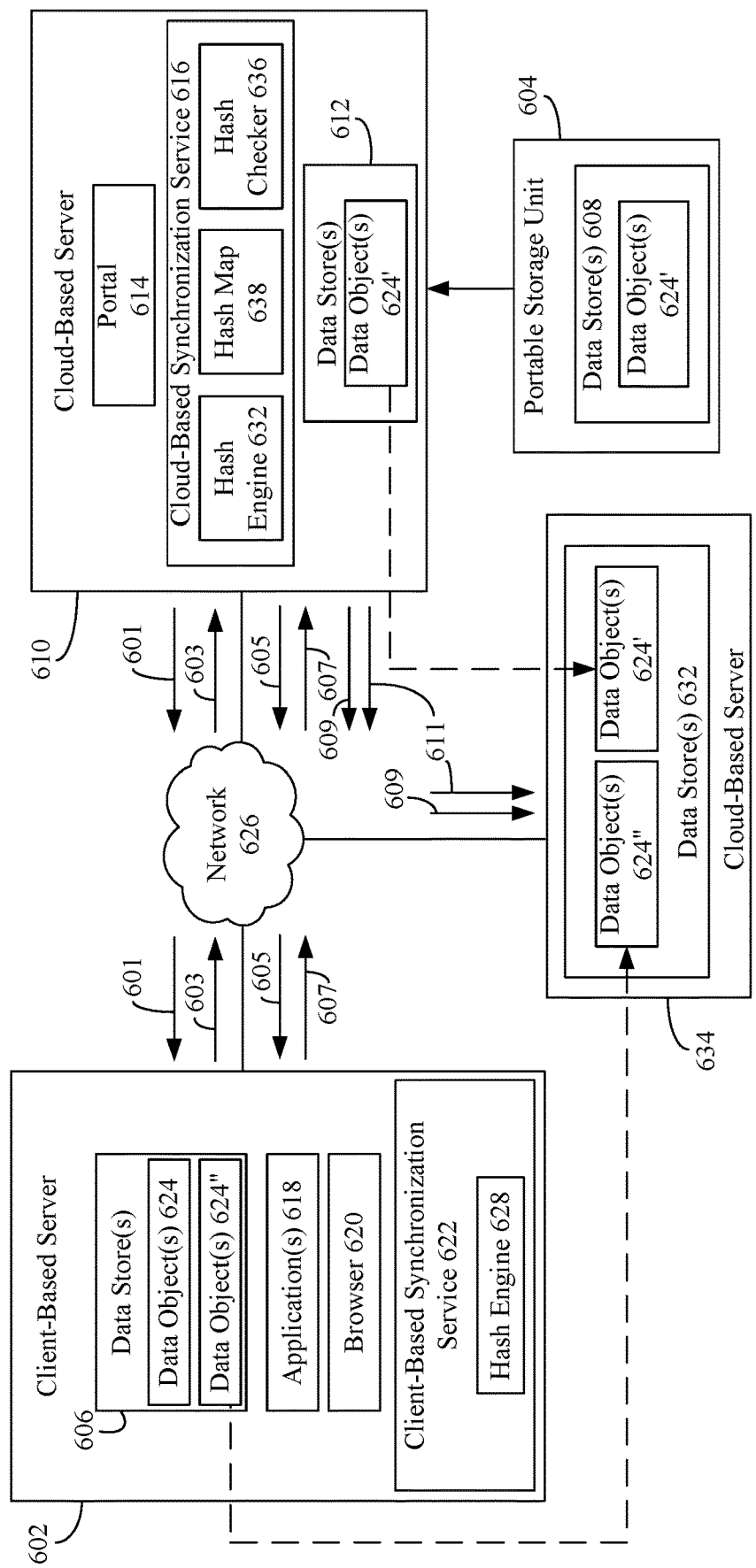
FIG. 6 is a block diagram of a data migration system for synchronizing data locally modified by the user with data maintained by cloud-based server(s) in accordance with an example embodiment.

For example, FIG. 5 depicts a flowchart 500 of an example method performed by a cloud-based synchronization service for synchronizing data locally modified by the user with data maintained by cloud-based server(s) in accordance with an example embodiment. The method of flowchart 500 will now be described with reference to system 600 of FIG. 6, although the method is not limited to that implementation. FIG. 6 is a block diagram of a system 600 for synchronizing data locally modified by the user with data maintained by cloud-based server(s) 610 in accordance with an example embodiment. As shown in FIG. 6, system 600 includes a client-based server 602, a first cloud-based server 610, a second cloud-based server 634, and a portable storage unit 604, which comprises data store(s) 608. Client-based server 602, portable storage unit 604, and data store(s) 608 are example of client-based server 402, portable storage unit 404, and data store(s) 408, as respectively described above with reference to FIGS. 4A-4C. First cloud-based server 610 and second cloud-based server 634 are examples of cloud-based server(s) 610, as described above with reference to FIG. 4C. Client-based server 602, first cloud-based server 610 and second cloud-based server 634 are communicatively coupled via a network 626, which is an example of network 426. As further shown in FIG. 6, client-based server 602 comprises data store(s) 606, application(s) 618, browser 620, and client-based synchronization service 622, each of which are examples of data store(s) 406, application(s) 418, browser 420, and client-based synchronization service 422, as described above with reference to FIGS. 4A-4C. As also shown in FIG. 6, cloud-based server(s) 610 comprise a portal 614, a cloud-based synchronization service 616 and data store(s) 612, each of which is an example of portal 414, cloud-based synchronization service 416 and data store(s) 412, as described above with reference to FIG. 4C. Client-based synchronization service 622 comprises a hash engine 628, which is an example of hash engine 428, as described above with reference to FIGS. 4A-4C. Cloud-based synchronization service 616 comprises a hash engine 632, a hash map 638, and a hash checker 636. Hash engine 632 is an example of hash engine 232, as described above with reference to FIG. 2. Other structural and operational embodiments will be apparent to persons skilled in the relevant art(s) based on the discussion regarding flowchart 500 and system 600 of FIG. 6.

As shown in FIG. 5, the method of flowchart 500 begins at step 502, in which a set of data comprising a first instance of a plurality of data objects is uploaded from a portable storage unit to a first cloud-based server of a plurality of cloud-based servers. A second instance of the plurality of data objects is stored on a client-based server remotely-located from the plurality of cloud-based servers. For example, with reference to FIG. 6, cloud-based synchronization service 616 uploads data object(s) 624' from portable storage unit 604 to data store(s) 612. As shown in FIG. 6, data store(s) 612 are maintained by cloud-based server 610, although the embodiments described herein are not so limited. For example, data store(s) 612 may be maintained by and/or included in another cloud-based server. The original instance of data object(s) 624' is locally-maintained in data store(s) 606 of client-based server 602 (shown as data object(s) 624). Data store(s) 612 represent a temporary location at which cloud-based server 616 stores data object(s) 624' during the data synchronization process.

In accordance with one or more embodiments, each of the first instance of the plurality of data objects and each of the second instance of the plurality of data objects comprise one of a data file, a database object, structured data, unstructured data, semi-structured data, or a data container.

At step 504, for each data object of the first instance of the plurality of data objects uploaded to the first cloud-based server, a corresponding first hash value is generated. For example, with reference to FIG. 6, hash engine 632 of cloud-based synchronization service 616 generates a corresponding first hash value for each of data object(s) 624' stored in data store(s) 612.

At step 506, a notification that the first instance of the plurality of data objects has been uploaded to the first cloud-based server is provided to the client-based server. For example, with reference to FIG. 6, cloud-based synchronization service 616 provides a notification 601 that data object(s) 624' have been uploaded to cloud-based server to client-based server 602 via network 626.

At step 508, a second hash value for each of the second instance of the plurality of data objects stored on the client-based server is received from the client-based server. For example, with reference to FIG. 6, hash engine 628 of client-based synchronization service 622 generates a corresponding second hash value for each of data object(s) 624 and data object(s) 624" and provides a response 603 that specifies the second hash values to cloud-based synchronization service 616 via network 626. Cloud-based synchronization service 616 of first client-based server 610 receives response 603.

In accordance with one or more embodiments, metadata associated with each of the second instances of the plurality of data objects is received. The metadata comprises the second hash value and at least one of a file access attribute each of the second instance of the plurality of data objects, a time stamp that indicates a time at which each of the second instance of the plurality of data objects was created or modified, or a directory in which each of the second instance of the plurality of data objects is located.

At step 510, for each second hash value of the second hash values receives, a determination is made as to whether the second hash value matches any of the first hash values. For example, with reference to FIG. 6, for each second hash value received, hash checker 636 compares the second hash value to the first hash values generated by hash engine 632. If a determination is made that the second hash value is different from each of the first hash values, this means that the instance of the data object associated with the second hash value, which is maintained locally by client-based server 602, was modified (or the data object has been newly-created) sometime after data object(s) 624 were copied to portable storage unit 604 and sent to the cloud-based service provider, and flow continues at step 512. If a match exists, this means that the data object associated with the second hash value was not modified and has already been copied to first cloud-based server, and flow continues at step 514.

At step 512, an indication is sent to the client-based server that specifies that the second hash value is different than each of the first hash values. For example, with reference to FIG. 6, cloud-based synchronization service 616 sends an indication 605 to cloud-based synchronization service 622 via network 626.

In accordance with one or more embodiments, in response to the determination that the second hash value is different from each of the first hash values, the second instance of the data object from the client-based server is received, and the second instance of the data object is stored at the second cloud-based server. For example, with reference to FIG. 6, responsive to indication 605, client-based synchronization service 622 retrieves the associated data object of data object(s) 624" from data store(s) 606 and provides a response 607 that includes the retrieved data object to cloud-based synchronization service 616 via network 626. Cloud-based synchronization service 616 receives response 607 from client-based synchronization service 622 and performs a write operation 609 to second cloud-based server 624 that causes the received data object of data object(s) 624" to be stored in data store(s) 632. Data store(s) 632 of cloud-based server 634 represents the primary location at which the client's synchronized data is available for use.

At step 514, the first instance of the data object associated with the matched first hash value is maintained. For example, with reference to FIG. 6, cloud-based synchronization service 616 maintains the data object in data store(s) 612. For instance, cloud-based synchronization service 616 may provide an indicator that specifies that the second hash value matches each of the first hash values. In response, client-based synchronization service 622 does not send a response 607 including the data object because cloud-based server 610 already has a copy of the data object.

In accordance with one or more embodiments, cloud-based synchronization service 616 maintains the data object by copying the first instance of the data object a second cloud-based server. For example, with reference to FIG. 6, cloud-based synchronization service 616 may perform a write operation 611 to cloud-based server 634 that causes the data object of data object(s) 624' associated with the matched first hash value to be copied to data store(s) 632 maintained by second cloud-based server 634.

In accordance with an embodiment, for each of the first instance of the plurality of data objects, a location at which the first instance of the data object is stored in the first cloud-based server is associated to the first hash value of the first instance of the data object in a hash map. For example, with reference to FIG. 6, cloud-based synchronization service 616 may generate a hash map 638 that associates each first hash value to the location at which the associated data object of data object(s) 624' is stored in data store(s) 612.

The cloud-based synchronization service is configured to copy the first instance of the data object to the second-based server by retrieving the first instance of the data object from the location specified in the hash map and storing the first instance of the data object in the second cloud-based server. For example, with reference to FIG. 6, for each of data object(s) 624' to be copied to data store(s) 632, cloud-based synchronization service 616 provides the first hash value of the data object to hash map 638, and hash map 638 outputs the location of the data object to cloud-based synchronization service 616. Cloud-based synchronization service 616 retrieves the data object from the location provided by hash map 634 and copies the data object to data store(s) 632. Once all the data object(s) have been synchronized and stored at the primary location (i.e., data stores) 632 of second cloud-based server 634), the data object(s) are made available for the user to use.

III. Additional Embodiments

Figure 7:
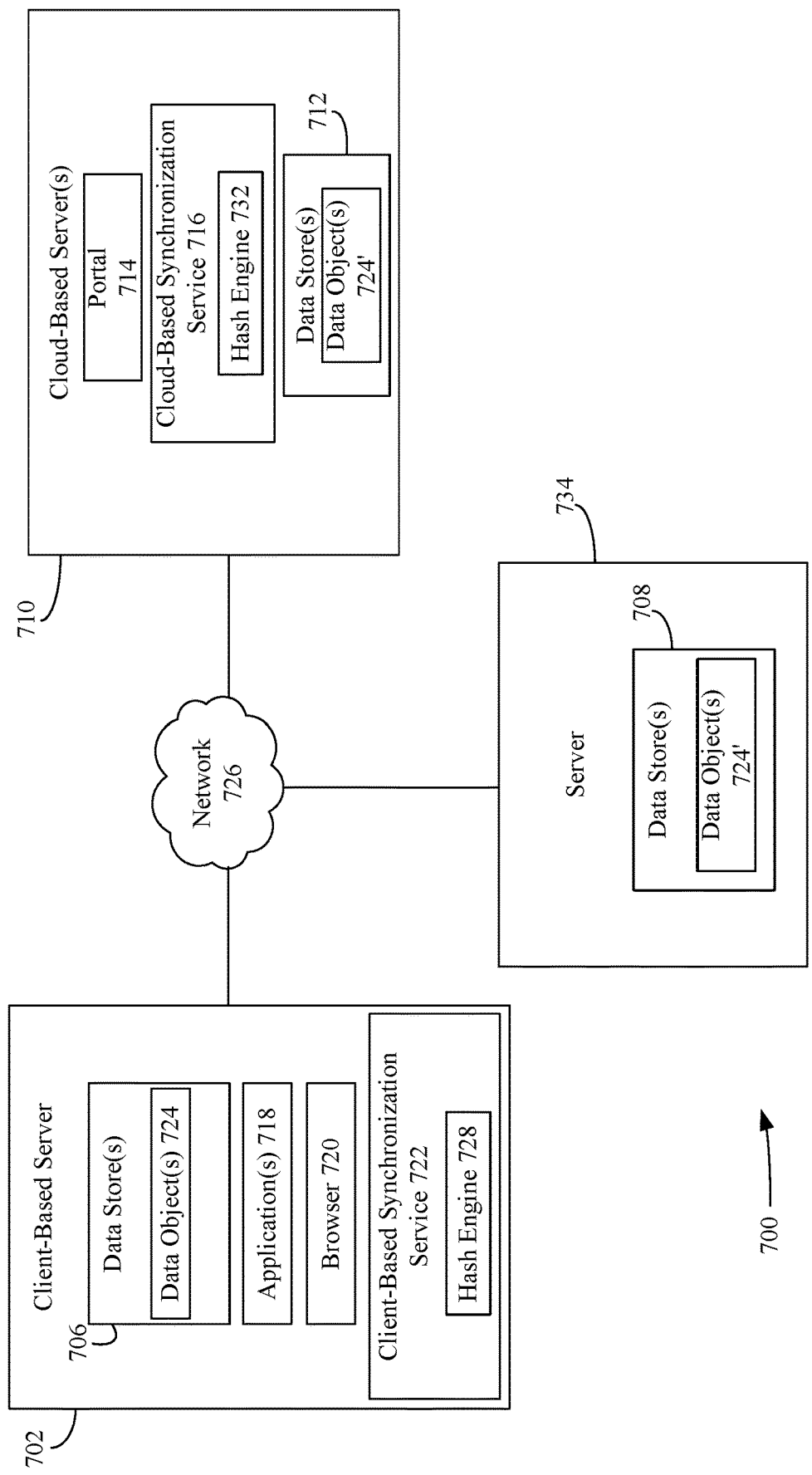
FIG. 7 is a block diagram of a data migration system for enabling a user to modify locally-maintained data during a data transfer process that utilizes a dedicated server in accordance with an embodiment.

While the foregoing embodiments describe data transfer techniques that utilize a portable storage unit, it is noted that other data transfer techniques may be utilized. For example, FIG. 7 is a block diagram of a system 700 for enabling a user to modify locally-maintained data during a data transfer process that utilizes a dedicated server 734 in accordance with an embodiment. As shown in FIG. 7, system 700 includes a client-based server 702, cloud-based server(s) 710 and server 734. Client-based server 702 and cloud-based server(s) 710 are examples of client-based server 602 and cloud-based server 610, as respectively described above with reference to FIG. 6. As shown in FIG. 7, client-based server 702 includes data store(s) 706, application(s) 718, a browser 720, and a client-based synchronization service 722, which comprises a hash engine 728. Data store(s) 706, application(s) 718, browser 720, client-based synchronization service 722, and hash engine 728, are examples of data store(s) 606, application(s) 618, browser 620, client-based synchronization service 622, and hash engine 628, as respectively described above with reference to FIG. 6. As further shown in FIG. 7, cloud-based server(s) 710 comprise data store(s) 712, portal 714, and a cloud-based synchronization service 716, which comprises a hash engine 732. Data store(s) 712, portal 714, cloud-based synchronization service 716, and hash engine 732 are examples of data store(s) 612, portal 614, cloud-based synchronization service 616, and hash engine 632, as respectively described above with reference to FIG. 6. Client-based server 702, cloud-based server(s) 710, and server 734 are communicatively coupled via a network 726, which is an example of network 626.

Server 734 may be a computing device (e.g., an edge appliance) that is dedicated to transferring the user's data to cloud-based server(s) 710. Data object(s) 724 stored in data store(s) 706 of client-based server 702 may be copied to data store(s) 708 of server 734. The copied instance of data object(s) 724 is shown as data object(s) 724'. Thereafter, server 734 transfers data object(s) 724' to cloud-based server(s) 710 via network 726. In accordance with an embodiment, data object(s) 724' are uploaded to cloud-based server(s) 6 via a dedicated, high bandwidth channel. For example, the cloud-based provider may offer, as an option to the user, a private, high bandwidth connection to cloud-based server(s) 710. Using the high bandwidth channel, server 734 provides data object(s) 624' to cloud-based server(s) 710.

Cloud-based server(s) 710 receive and store data object(s) 724' in data store(s) 712 maintained thereby. Cloud-based synchronization service 716 and client-based synchronization service 722 synchronize data objects(s) 724' maintained by cloud-based server(s) 710 with data object(s) 724 maintained by client-based server 702 in a similar manner as described above with reference to FIGS. 1-6. For example, cloud-based synchronization service 716 may determine whether any changes were made to data object(s) 724 maintained by client-based server 702 and incorporates those changes with respect to data objects(s) 724'.

For instance, hash engine 732 may generate a hash value for each of data object(s) 724'. Cloud-based synchronization service 716 also provides a notification to client-based synchronization service 722 via network 726 that indicates that data object(s) 724' have been uploaded to cloud-based server(s) 710. Upon receiving the notification, client-based synchronization service 722 may provide a respective hash value for each of data object(s) 724 (which are generated by hash engine 728) to cloud-based synchronization service 716.

After receiving the hash values from client-based synchronization service 722, cloud-based synchronization service 716 may compare the hash values generated for data object(s) 724' to the hash values generated for data object(s) 724. For each data object, cloud-based synchronization service 722 may provide an indication specifying whether the associated hash value is different than the hash values generated for data object(s) 724'. If a different hash value is detected, cloud-based synchronization service 716 determines that a corresponding data object of data object(s) 724' has been modified locally at client-based server 702 or that a new data object has been created at client-based server 702. In response to the indication specifying that the hash value provided to cloud-based synchronization service 716 does not match the hash values generated by cloud-based synchronization service 716, client-based synchronization service 722 provides the associated data object of data object(s) 724 to cloud-based synchronization service 716 via network 726.

Cloud-based synchronization 716 stores the received data object(s) into data store(s) 712, and, as a result, cloud-based server(s) 710 stores the same version of the data object(s) that are maintained by client-based server 702 (i.e., the data object(s) maintained by cloud-based server(s) 710 is synchronized with the data object(s) maintained by client-based server 702). Client-based synchronization service 722 does not send data object(s) for indication(s) received from cloud-based synchronization service 716 that specify that the corresponding hash values match because such data object(s) are already stored in data store(s) 712.

IV. Example Computer System Implementation

Client-based server 102, cloud-based server(s) 110, client-based server 202, cloud-based server(s) 210, client-based server 402, cloud-based server(s) 410, client-based server 602, cloud-based server 610, cloud-based server 634, client-based server 702, cloud-based server(s) 710, server 734, client-based synchronization service 222, hash engine 228, cloud-based synchronization service 216, hash engine 232, client-based synchronization service 422, hash engine 428, cloud-based synchronization service 416, cloud-based synchronization service 622, hash engine 628, cloud-based synchronization service 616, hash engine 632, hash map 638, hash checker 636, client-based synchronization service 722, hash engine 728, cloud-based synchronization service 716, hash engine 732, flowchart 300 of FIG. 3, and/or flowchart 500 of FIG. 5, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 8:
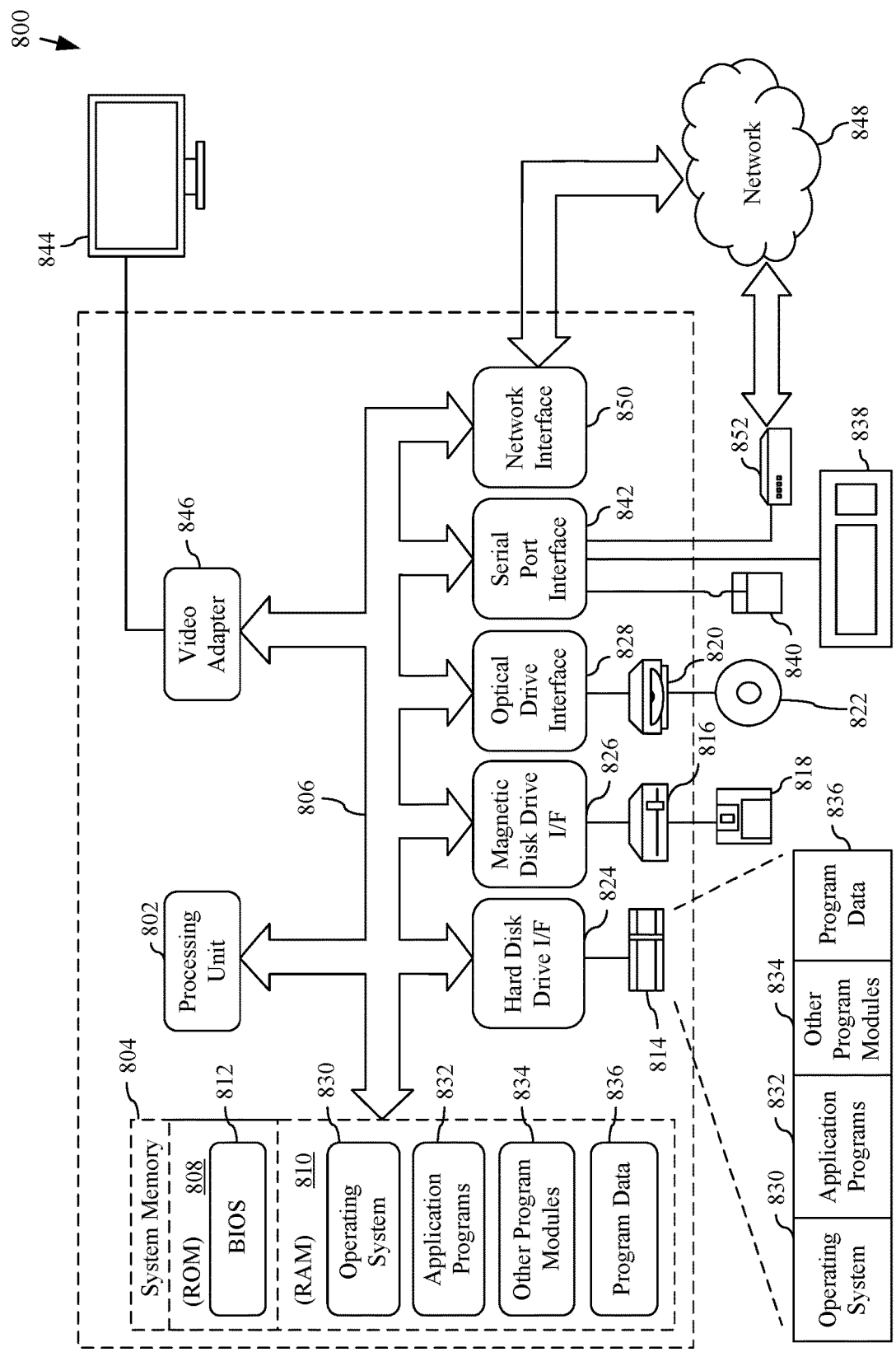
FIG. 8 is a block diagram of an example computing device that may be used to implement embodiments.

FIG. 8 depicts an example processor-based computer system 800 that may be used to implement various embodiments described herein. For example, system 800 may be used to implement client-based server 102, cloud-based server(s) 110, client-based server 202, cloud-based server(s) 210, client-based server 402, cloud-based server(s) 410, client-based server 602, cloud-based server 610, cloud-based server 634, portable storage unit 604, client-based server 702, cloud-based server(s) 710, and server 734. System 800 may also be used to implement any of the steps of any of the flowcharts of FIGS. 3 and 5, as described above. The description of system 800 provided herein is provided for purposes of illustration, and is not intended to be limiting. Embodiments may be implemented in further types of computer systems, as would be known to persons skilled in the relevant art(s).

As shown in FIG. 8, system 800 includes a processing unit 802, a system memory 804, and a bus 806 that couples various system components including system memory 804 to processing unit 802. Processing unit 802 may comprise one or more circuits (e.g. processor circuits), microprocessors or microprocessor cores. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random access memory (RAM) 810. A basic input/output system 812 (BIOS) is stored in ROM 808.

System 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, BLU-RAY™ disk or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 830, one or more application programs 832, other program modules 834, and program data 836. In accordance with various embodiments, the program modules may include computer program logic that is executable by processing unit 802 to perform any or all of the functions and features of Client-based server 102, cloud-based server(s) 110, client-based server 202, cloud-based server(s) 210, client-based server 402, cloud-based server(s) 410, client-based server 602, cloud-based server 610, cloud-based server 634, portable storage unit 604, client-based server 702, cloud-based server(s) 710, and server 734. The program modules may also include computer program logic that, when executed by processing unit 802, causes processing unit 802 to perform any of the steps of any of the flowcharts of FIGS. 3 and 5, as described above.

A user may enter commands and information into system 800 through input devices such as a keyboard 838 and a pointing device 840 (e.g., a mouse). Other input devices (not shown) may include a microphone, joystick, game controller, scanner, or the like. In one embodiment, a touch screen is provided in conjunction with a display 844 to allow a user to provide user input via the application of a touch (as by a finger or stylus for example) to one or more points on the touch screen. These and other input devices are often connected to processing unit 802 through a serial port interface 842 that is coupled to bus 806, but may be connected by other interfaces, such as a parallel port, game port, or a universal serial bus (USB). Such interfaces may be wired or wireless interfaces.

Display 844 is connected to bus 806 via an interface, such as a video adapter 846. In addition to display 844, system 600 may include other peripheral output devices (not shown) such as speakers and printers.

System 800 is connected to a network 848 (e.g., a local area network or wide area network such as the Internet) through a network interface 850, a modem 852, or other suitable means for establishing communications over the network. Modem 852, which may be internal or external, is connected to bus 806 via serial port interface 842.

As used herein, the terms "computer program medium," "computer-readable medium," and "computer-readable storage medium" are used to generally refer to memory devices or storage structures such as the hard disk associated with hard disk drive 814, removable magnetic disk 818, removable optical disk 822, as well as other memory devices or storage structures such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 832 and other program modules 834) may be stored on the hard disk, magnetic disk, optical disk, ROM, or RAM. Such computer programs may also be received via network interface 850, serial port interface 842, or any other interface type. Such computer programs, when executed or loaded by an application, enable system 800 to implement features of embodiments discussed herein. Accordingly, such computer programs represent controllers of the system 800. Embodiments are also directed to computer program products comprising software stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to memory devices and storage structures such as RAM, hard drives, floppy disks, CD ROMs, DVD ROMs, zip disks, tapes, magnetic storage devices, optical storage devices, MEMs, nanotechnology-based storage devices, and the like.

Embodiments are also directed to computer program products comprising computer code or instructions stored on any computer-readable medium or computer-readable storage medium. Such computer program products include hard disk drives, optical disk drives, memory device packages, portable memory sticks, memory cards, and other types of physical storage hardware.

V. Additional Exemplary Embodiments

A method is described herein. The method includes: copying a set of data comprising a plurality of data objects from a data store located at a first location to a portable storage unit; modifying a first data object of the plurality of data objects in the data store; receiving, from a cloud-based synchronization service, a notification that the set of data copied to the portable storage unit is uploaded to a cloud-based server located at a second location; generating a first hash value for the modified first data object; and providing the first hash value generated for the modified first data object to the cloud-based synchronization service in response to receiving the notification, the cloud-based synchronization service being configured to compare the first hash value to a second hash value generated for a second data object uploaded to the cloud-based server that corresponds to the first data object to determine whether a difference exits between the first data object and the corresponding second data object.

In an embodiment of the method, generating the first hash value comprises: generating the first hash value for the modified first data object in response to receiving the notification.

In an embodiment of the method, generating the first hash value comprises: generating the hash for the modified first data object responsive to the first data object being modified.

In an embodiment of the method, the method further comprises: receiving an indicator from the cloud-based synchronization service specifying whether the first hash value is different than the second hash value generated for the second data object uploaded to the cloud-based server; and providing the modified first data object to the cloud-based synchronization service in response to the indicator specifying that the first hash value is different than the second hash value.

In an embodiment of the method, providing the first hash value comprises: providing metadata associated with the modified first data object, the metadata comprising the first hash value and at least one of: a file access attribute of the modified first data object; a time stamp that indicates a time at which the modified first data object was modified; a directory in which the modified first data object is located; or a name of the modified first data object.

In an embodiment of the method, modifying the first data object of the plurality of data objects in the data store comprises: modifying the first data object of the plurality of data objects in the data store while the portable storage unit is being physically transported to the second location comprising the plurality of cloud-based servers.

In an embodiment of the method, the method further includes: generating a third hash value for each of the other data objects of the plurality of data objects; and providing the third hash values to the cloud-based synchronization service in response to receiving the notification, the cloud-based synchronization service being configured to compare the third hash values to fourth hash values generated for data objects uploaded to the cloud-based server that correspond to the other data objects of the data store to determine whether a difference exits between the data objects uploaded to the cloud-based server and the other data objects.

A computer-readable storage medium having program instructions recorded thereon that, when executed by at least one processor, perform a method is also described herein. The method includes: copying a set of data comprising a plurality of data objects from a data store located at a first location to a portable storage unit; modifying a first data object of the plurality of data objects in the data store; receiving, from a cloud-based synchronization service, a notification that the set of data copied to the portable storage unit is uploaded to a cloud-based server located at a second location; generating a first hash value for the modified first data object; and providing the first hash value generated for the modified first data object to the cloud-based synchronization service in response to receiving the notification, the cloud-based synchronization service being configured to compare the first hash value to a second hash value generated for a second data object uploaded to the cloud-based server that corresponds to the first data object to determine whether a difference exits between the first data object and the corresponding second data object.

In an embodiment of the computer-readable storage medium, generating the first hash value comprises: generating the first hash value for the modified first data object in response to receiving the notification.

In an embodiment of the computer-readable storage medium, generating the first hash value comprises: generating the hash for the modified first data object responsive to the first data object being modified.

In an embodiment of the computer-readable storage medium, the method further comprises: receiving an indicator from the cloud-based synchronization service specifying whether the first hash value is different than the second hash value generated for the second data object uploaded to the cloud-based server; and providing the modified first data object to the cloud-based synchronization service in response to the indicator specifying that the first hash value is different than the second hash value.

In an embodiment of the computer-readable storage medium, providing the first hash value comprises: providing metadata associated with the modified first data object, the metadata comprising the first hash value and at least one of: a file access attribute of the modified first data object; a time stamp that indicates a time at which the modified first data object was modified; a directory in which the modified first data object is located; or a name of the modified first data object.

In an embodiment of the computer-readable storage medium, modifying the first data object of the plurality of data objects in the data store comprises: modifying the first data object of the plurality of data objects in the data store while the portable storage unit is being physically transported to the second location comprising the plurality of cloud-based servers.

In an embodiment of the computer-readable storage medium, the method further includes: generating a third hash value for each of the other data objects of the plurality of data objects; and providing the third hash values to the cloud-based synchronization service in response to receiving the notification, the cloud-based synchronization service being configured to compare the third hash values to fourth hash values generated for data objects uploaded to the cloud-based server that correspond to the other data objects of the data store to determine whether a difference exits between the data objects uploaded to the cloud-based server and the other data objects.

A server is further described herein. The includes at least one processor circuit; and at least one memory that stores program code configured to be executed by the at least one processor circuit, the program code comprising: a cloud-based synchronization service configured to: upload a set of data comprising a first instance of a plurality of data objects from a portable storage unit to a first cloud-based server of a plurality of cloud-based servers, a second instance of the plurality of data objects being stored on a client-based server remotely-located from the plurality of cloud-based servers; for each data object of the first instance of the plurality of data objects uploaded to the first cloud-based server, generate a corresponding first hash value; provide a notification to the client-based server that the first instance of the plurality of data objects has been uploaded to the first cloud-based server; receive, from the client-based server, second hash values from the client-based server, each of the second hash values individually corresponding to a data object of the second instance of the plurality of data objects; and for each second hash value of the second hash values received: determine whether the second hash value matches any of the first hash values; in response to a determination that the second hash value is different from each of the first hash values, send an indication to the client-based server that specifies that the second hash value is different than each of the first hash values; and in response to a determination that the second hash value matches one of the first hash values, maintain the first instance of the data object associated with the matched first hash value.

In an embodiment of the server. the cloud-based synchronization service is configured to maintain the first instance of the data object by: copying the first instance of the data object to a second cloud-based server.

In an embodiment of the server, the cloud-based synchronization service is further configured to: for each of the first instance of the plurality of data objects: associate, in a hash map, a location at which the first instance of the data object is stored in the first cloud-based server to the first hash value of the first instance of the data object; wherein the cloud-based synchronization service is configured to copy the first instance of the data object to the second cloud-based server by: retrieving the first instance of the data object from the location specified in the hash map and storing the first instance of the data object in the second cloud-based server.

In an embodiment of the server, the cloud-based synchronization service is further configured to, in response to the determination that the second hash value is different from each of the first hash values: receive the second instance of the data object from the client-based server; and store the second instance of the data object at the second cloud-based server.

In an embodiment of the server, the cloud-based synchronization service is configured to receive, from the client-based server, the second hash value for each of the second instance of the plurality of data objects by: receiving metadata associated with each of the second instance of the plurality of data objects, the metadata comprising the second hash value and at least one of: a file access attribute of each of the second instance of the plurality of data objects; a time stamp that indicates a time at which each of the second instance of the plurality of data objects was created or modified; a directory in which each of the second instance of the plurality of data objects is located; or a name of each of the second instance of the plurality of data objects.

In an embodiment of the server, each of the first instance of the plurality of data objects and each of the second instance of the plurality of data objects comprise one of: a data file; a database object; structured data; unstructured data; semi-structured data; or a data container.

VI. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A method, comprising:
    copying a set of data comprising a plurality of data objects from a data store located at a first location to an intermediate portable storage unit locally coupled to the data store;
    modifying a first data object of the plurality of data objects in the data store after said copying;
    receiving, via a network from a cloud-based synchronization service, a notification that the set of data copied to the intermediate portable storage unit is uploaded to a cloud-based server located at a second location;
    generating a first hash value for the modified first data object;
    providing, via the network, the first hash value generated for the modified first data object to the cloud-based synchronization service in response to receiving the notification, the cloud-based synchronization service being configured to compare the first hash value to a second hash value generated for a second data object uploaded to the cloud-based server that corresponds to the first data object to determine whether a difference exits between the first data object and the corresponding second data object;
    receiving, via the network an indicator from the cloud-based synchronization service specifying whether the first hash value is different than the second hash value generated for the second data object uploaded to the cloud-based server; and
    providing, via the network, the modified first data object and metadata associated with the modified first data object to the cloud-based synchronization service in response to the indicator specifying that the first hash value is different than the second hash value, the cloud-based synchronization service being further configured to apply the metadata to the modified first data object.

2. The method of claim 1, wherein generating the first hash value comprises:
    generating the first hash value for the modified first data object in response to receiving the notification.

3. The method of claim 1, wherein generating the first hash value comprises:
    generating the hash for the modified first data object responsive to the first data object being modified.

4. The method of claim 1, wherein the metadata comprises at least one of:
    a file access attribute of the modified first data object;
    a time stamp that indicates a time at which the modified first data object was modified;
    a directory in which the modified first data object is located; or
    a name of the modified first data object.

5. The method of claim 1, wherein modifying the first data object of the plurality of data objects in the data store comprises:
    modifying the first data object of the plurality of data objects in the data store while the intermediate portable storage unit is being physically transported to the second location comprising the plurality of cloud-based servers.

6. The method of claim 1, further comprising:
    generating a third hash value for each of the other data objects of the plurality of data objects; and
    providing the third hash values to the cloud-based synchronization service in response to receiving the notification, the cloud-based synchronization service being configured to compare the third hash values to fourth hash values generated for data objects uploaded to the cloud-based server that correspond to the other data objects of the data store to determine whether a difference exits between the data objects uploaded to the cloud-based server and the other data objects.

7. A computer-readable storage medium having program instructions recorded thereon that, when executed by at least one processor, perform a method, the method comprising:
    copying a set of data comprising a plurality of data objects from a data store located at a first location to an intermediate portable storage unit locally coupled to the data store;
    modifying a first data object of the plurality of data objects in the data store after said copying;
    receiving, via a network from a cloud-based synchronization service, a notification that the set of data copied to the intermediate portable storage unit is uploaded to a cloud-based server located at a second location;
    generating a first hash value for the modified first data object;
    providing, via the network, the first hash value generated for the modified first data object to the cloud-based synchronization service in response to receiving the notification, the cloud-based synchronization service being configured to compare the first hash value to a second hash value generated for a second data object uploaded to the cloud-based server that corresponds to the first data object to determine whether a difference exits between the first data object and the corresponding second data object;

receiving, via the network an indicator from the cloud-based synchronization service specifying whether the first hash value is different than the second hash value generated for the second data object uploaded to the cloud-based server; and providing, via the network, the modified first data object and metadata associated with the modified first data object to the cloud-based synchronization service in response to the indicator specifying that the first hash value is different than the second hash value, the cloud-based synchronization service being further configured to apply the metadata to the modified first data object.

8. The computer-readable storage medium of claim 7, wherein generating the first hash value comprises:
generating the first hash value for the modified first data object in response to receiving the notification.

9. The computer-readable storage medium of claim 7, wherein generating the first hash value comprises:
generating the hash for the modified first data object responsive to the first data object being modified.

10. The computer-readable storage medium of claim 7, wherein the metadata comprises at least one of:
a file access attribute of the modified first data object;
a time stamp that indicates a time at which the modified first data object was modified;
a directory in which the modified first data object is located; or
a name of the modified first data object.

11. The computer-readable storage medium of claim 7, wherein modifying the first data object of the plurality of data objects in the data store comprises:
modifying the first data object of the plurality of data objects in the data store while the intermediate portable storage unit is being physically transported to a second location comprising the plurality of cloud-based servers.

12. The computer-readable storage medium of claim 7, the method further comprises:
generating a third hash value for each of the other data objects of the plurality of data objects; and
providing the third hash values to the cloud-based synchronization service in response to receiving the notification, the cloud-based synchronization service being configured to compare the third hash values to fourth hash values generated for data objects uploaded to the first cloud-based server that correspond to the other data objects of the data store to determine whether a difference exits between the data objects uploaded to the first cloud-based server and the other data objects.

13. A server, comprising:
at least one processor circuit; and
at least one memory that stores program code configured to be executed by the at least one processor circuit, the program code comprising:
a cloud-based synchronization service configured to:
upload a set of data comprising a first instance of a plurality of data objects from an intermediate portable storage unit to a first cloud-based server of a plurality of cloud-based servers, the intermediate portable storage unit being locally coupled to the first cloud-based server, a second instance of the plurality of data objects being stored on a client-based server remotely-located from the plurality of cloud-based servers;

for each data object of the first instance of the plurality of data objects uploaded to the first cloud-based server from the intermediate portable storage unit, generate a corresponding first hash value;

provide, via a network, a notification to the client-based server that the first instance of the plurality of data objects has been uploaded to the first cloud-based server from the intermediate portable storage unit;

receive, via the network from the client-based server, second hash values, each of the second hash values individually corresponding to a data object of the second instance of the plurality of data objects; and for each second hash value of the second hash values received:
determine whether the second hash value matches any of the first hash values;
in response to a determination that the second hash value is different from each of the first hash valued;
send, via the network, an indication to the client-based server that specifies that the second hash value is different than each of the first hash values;
receive, via the network from the client-based server, a data object of the second instance of the plurality of data objects corresponding to the second hash value and metadata associated with the data object of the second instance of the plurality of data objects corresponding to the second hash value; and
store the data object of the second instance of the plurality of data objects corresponding to the second hash value in accordance with the metadata; and
in response to a determination that the second hash value matches one of the first hash values, maintain the first instance of the data object associated with the matched first hash value.

14. The server of claim 13, wherein the cloud-based synchronization service is configured to maintain the first instance of the data object by:
copying the first instance of the data object to a second cloud-based server.

15. The server of claim 14, wherein the cloud-based synchronization service is further configured to:
for each of the first instance of the plurality of data objects:
associate, in a hash map, a location at which the first instance of the data object is stored in the first cloud-based server to the first hash value of the first instance of the data object;
wherein the cloud-based synchronization service is configured to copy the first instance of the data object to the second cloud-based server by:
retrieving the first instance of the data object from the location specified in the hash map and storing the first instance of the data object in the second cloud-based server.

16. The server of claim 13, wherein the metadata associated with each of the second instance of the plurality of data objects comprises at least one of:

a file access attribute of each of the second instance of the plurality of data objects;
a time stamp that indicates a time at which each of the second instance of the plurality of data objects was created or modified;
a directory in which each of the second instance of the plurality of data objects is located; or
a name of each of the second instance of the plurality of data objects.

17. The server of claim 13, wherein each of the first instance of the plurality of data objects and each of the second instance of the plurality of data objects comprise one of:
a data file;
a database object;
structured data;
unstructured data;
semi-structured data; or
a data container.

18. The method of claim 1, wherein the plurality of data objects comprises at least one of:
a database object;
structured data;
unstructured data;
semi-structured data; or
a data container.

19. The computer-readable storage medium of claim 7, wherein the plurality of data objects comprises at least one of:
a database object;
structured data;
unstructured data;
semi-structured data; or
a data container.

20. The server of claim 14, wherein the cloud-based synchronization service is configured to store the data object of the second instance of the plurality of data objects corresponding to the second hash value in the second cloud-based server.

* * * * *